A. DILLMAN.
Corn Sheller.

No. 18,139.

2 Sheets—Sheet 1.

Patented Sept. 8, 1857.

A. DILLMAN.
Corn Sheller.

2 Sheets—Sheet 2.

No. 18,139.

Patented Sept. 8, 1857.

UNITED STATES PATENT OFFICE.

ANDREW DILLMAN, OF PLAINFIELD, ILLINOIS.

CORN-SHELLER.

Specification of Letters Patent No. 18,139, dated September 8, 1857.

*To all whom it may concern:*

Be it known that I, ANDREW DILLMAN, of Plainfield, in the county of Will and State of Illinois, have invented a new and useful Improvement in Machines for Shelling and Separating Corn; and I do hereby declare the following to be a full, clear, and exact description of the construction and operation of the same, reference being had to the accompanying drawings, making a part thereof, in which—

Figure 1:
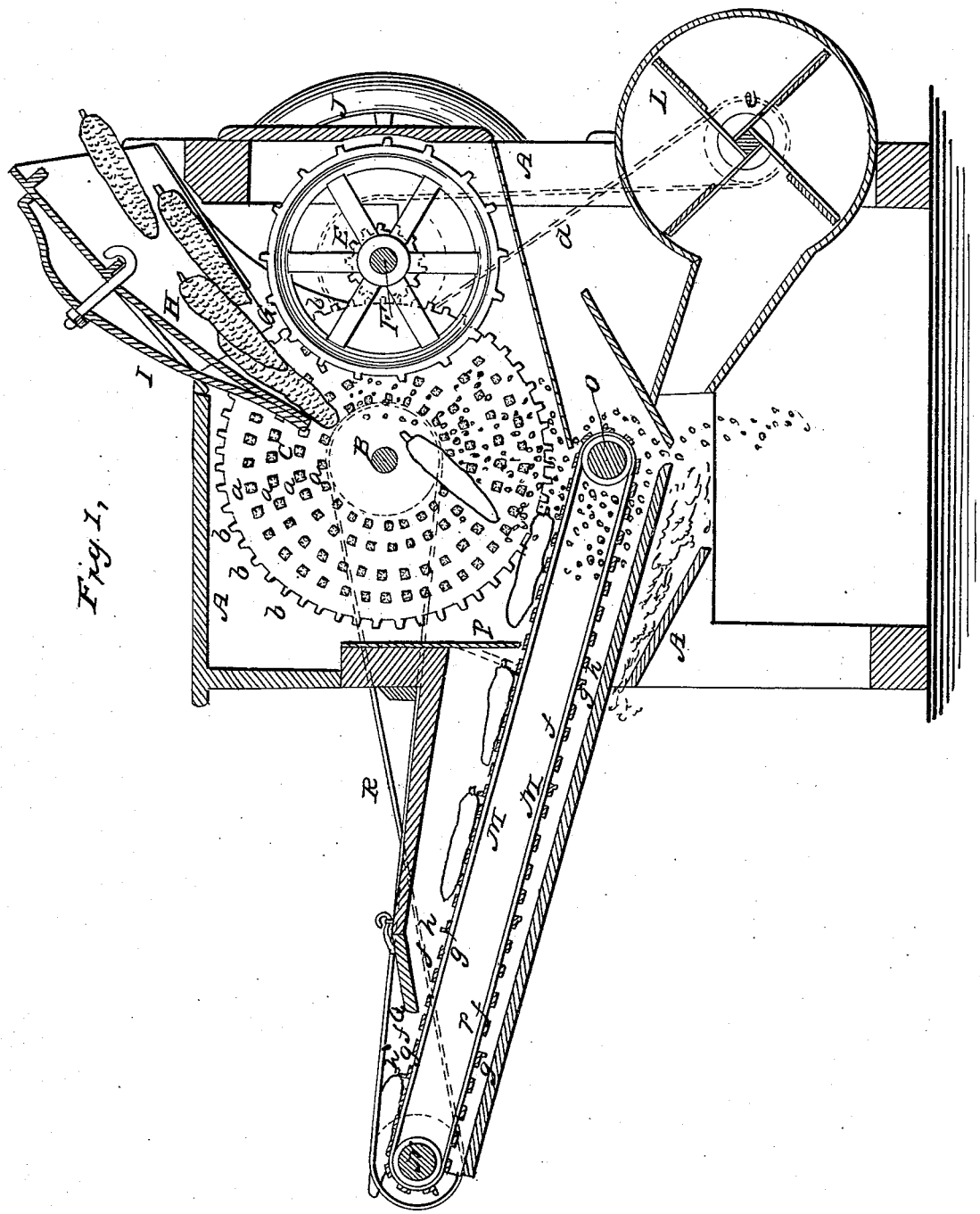
Figure 2:
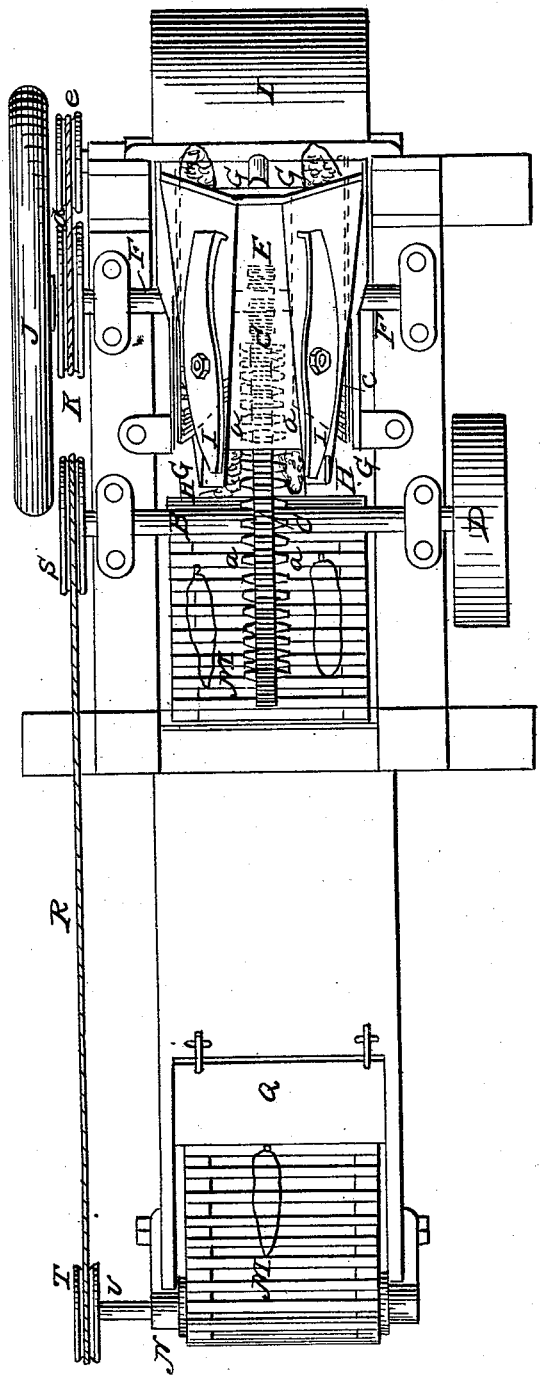

Figure 1, represents a vertical longitudinal section through the machine, and Fig. 2, represents a top plan.

Similar letters of reference where they occur in the separate figures denote like parts of the machine in both.

The nature of my invention relates to the manner in which I have constructed and arranged the carrying apron, in connection with the "inclined trunk" so as to separate and carry off the cobs, without carrying off, or out of the machine, the corn with said cobs.

To enable others skilled in the art to make and use my invention, I will proceed to describe the same with reference to the drawings.

A, represents the frame of the machine, in which the operating machinery is suitably incased.

B, is a shaft supported in the frame, which carries the shelling disk C. One end of this shaft is provided with a pulley D, over which an endless belt may pass, to give it motion. The faces of the shelling disk, are provided with teeth $a$, $a$, $a$, for taking the corn from the cobs, in connection with other parts acting in concert with it, and which will be hereafter described. The periphery of the shelling disk is provided with cogs $b$, $b$, $b$, &c., which take into a pinion E, centrally placed on a shaft F, and thus give motion to said shaft. Upon this shaft F, are placed two shelling wheels G, G, with beveled faces provided with ribs, teeth or projections $c$, $c$, said beveled parts, facing each other, and each one acting in concert with one face of the shelling disk C. The shelling wheels G, G, have a much more rapid motion than the disk C, and this holding back of the ear of corn by the disk C, tends to turn it around upon its longest axis and thus present every part of it to the shelling surfaces of the wheels. A holding board H, controlled by a spring I, is so arranged as to keep the ears of corn to the faces of the disk, and in contact with the shelling surfaces—there being one such, for each face of the disk—or in other words there being two feeding points in the machine. On the end of the shaft F, is a fly or balance wheel J, and also a pulley K, from which runs an endless belt $d$, to and around a pulley $e$ on the shaft of the fad wheel L, located near the bottom of the machine. The blast from the fan wheel L, is in nearly the direction of the line of the endless carrying belt, for separating all the impurities from the corn, except the cob which is carried off by the belt.

In so much of the machine as is above described, there is a general resemblance to other corn shellers; but my invention relates more especially to the manner of carrying off the cobs without carrying off the corn with them, and this I do as follows: M, is an endless carrying belt passing over two shafts or rollers N, O, the one (N) being considerably elevated above the other (O) so that the carrying belt shall stand on an inclination as shown in Fig. 1. This carrying belt is composed of two kinds of lags $f$, $g$—the former ($f$) being flat, and the latter ($g$), having upon their forward or advancing edges a flange $h$ turned up at right angles to the flat surface. They could not all have the flange because they would not make a holding support to the cobs, which pass out, as they are introduced into the machine viz., points foremost, as shown in red lines in the Figs. 1, 2. If the carrying belt were horizontal instead of inclined, the grains of corn which are thrown with such violence from the shelling wheels would fly out, of the machine, but the inclination of said belt causes the grains to strike the lags of the belt, and thus their impetus being checked they remain in the machine, and find their way to the proper exit below. It will be seen, however, that in curing one evil, another arises, which must be also provided for, for in inclining the belt, though it prevents the corn from flying, it detracts from its facility to carry out the cobs also, as they would slip back on the belt, unless some provision were made to prevent it. On the lags $g$, I make the flange $h$, for this purpose, the butts of the ears are caught against this flange or ledge, and by it are forced along on the apron or belt M, out of the machine. It would not answer to put the ledge or flange h, on the rear edge of the lags, for then it would form a trough or shelf for the grains of shelled corn to lodge against, and they would be carried out of the machine; but by putting them on the front or advancing edge, the corn will slip off and falling between the slats, run back to the regular exit. Besides this, the inclination of the carrying belt or apron, together with the ledge on the lags, enables me to introduce flaps P, Q, which may hang down quite close to the lags, and which the cobs will raise and pass under, and thus again diminish the tendency of the grains from passing or flying out of the machine. Of the flaps—one P, may be made of leather, or other yielding material of a similar nature, and the other Q, may be a hinged wooden one. By these contrivances I am able to perfectly shell, and as perfectly separate the corn from the cob, and other finer impurities.

The carrying belt is driven by an endless belt R, passing over a pulley S, on the shaft B, and another pulley T, on the shaft U, of the roller N— the other roller O, turning by the friction of the belt upon it. The belt M, may be thus very closely incased, and yet the cobs carried out by it, without carrying out the shelled corn.

Having thus fully described the nature of my invention, what I claim therein as new and desire to secure by Letters Patent is—

In combination with an inclined trunk such as herein described, the inclined carrying apron or belt M, with its lags $f$, $g$, arranged in manner, and for the purpose set forth.

ANDREW DILLMAN.

Witnesses:
 JACOB DIEL,
 I. H. HARTER.